United States Patent [19]

Wiser et al.

[11] 3,791,504

[45] Feb. 12, 1974

[54] APPARATUS FOR HANDLING AND DRYING PENCIL LEADS

[75] Inventors: Verlon E. Wiser, Shelbyville; Charles W. McCallie, Bell Buckle, both of Tenn.

[73] Assignee: Hasbro Industries, Inc., Pawtucket, R.I.

[22] Filed: Mar. 15, 1971

[21] Appl. No.: 124,536

Related U.S. Application Data

[62] Division of Ser. No. 879,381, Nov. 24, 1969, Pat. No. 3,586,298.

[52] U.S. Cl. ................................ 198/1, 198/20 R
[51] Int. Cl. .............................................. B65g 35/00
[58] Field of Search .... 53/236, 148, 131; 198/20, 1; 425/363, 392, 402

[56] References Cited
UNITED STATES PATENTS

| 3,358,414 | 12/1967 | Hersh | 53/131 X |
| 3,535,847 | 10/1970 | Strohmeier | 53/236 X |

Primary Examiner—Evon C. Blunk
Assistant Examiner—Douglas D. Watts
Attorney, Agent, or Firm—Salter & Michaelson

[57] ABSTRACT

Apparatus for handling and drying pencil leads comprising means for receiving the leads after extrusion and cutting thereof but while the leads are still moisture laden and hence limp and easily deformable, said means maintaining the leads in straightened condition while loading the leads into cylindrical cans, the loaded can being rotatable about their own axes to maintain the leads therein in straightened condition, the apparatus further comprising a rotary furnace for receiving the loaded cylindrical cans to effect drying of the leads, said rotary furnace comprising a rotor that slowly moves the loaded cans through an annular heating chamber, the loaded cans being mounted on discs which are rotatably mounted on the rotor, and drive means for simultaneously imparting rotation to the rotor and to the discs, the rotation of the latter being at a substantially greater rate than the rotation of the former, whereby as the rotor slowly carries the loaded cans through the heating chamber, the discs are simultaneously rotating about their own axes.

7 Claims, 13 Drawing Figures

3,791,504

APPARATUS FOR HANDLING AND DRYING PENCIL LEADS

This is a division of application Ser. No. 879,381, filed Nov. 24, 1969 now abandoned.

BACKGROUND OF THE INVENTION

In the manufacture of pencil leads, the lead is first extruded and then cut to length. At this stage in the manufacturing process, the lead is limp and easily deformable and possesses a high moisture content. The problem is to maintain the lead in substantially straight and unbroken form and at the same time remove substantially all of the moisture therefrom, so that the lead will be in proper condition for the firing operation.

SUMMARY OF THE INVENTION

The instant invention provides apparatus for overcoming the above mentioned problem. Generally speaking, the present invention comprises a combination of handling means and drying means.

The handling means comprises apparatus that receives the limp leads and, while maintaining them in substantially straight and unbroken condition, feeds the leads to a loading cup, which in turn transfers the leads to a cylindrical heating can. Means are provided for causing the loaded heating cans to rotate about their own axis prior to introduction of the loaded cans to the drying apparatus.

The drying apparatus comprises a rotary furnace having a rotor, the peripheral portion of which is enclosed by an annular heating chamber. Rotatably mounted on the rotor, adjacent the periphery thereof, are a plurality of discs, each of which has means for receiving a plurality of loaded heating cans. The axes of the rotor, the discs, and of the leads per se are all substantially parallel to each other, and drive means are provided for simultaneously rotating the rotor and the discs, the rotation of the latter being at a substantially greater rate than that of the former. Thus, as the rotor slowly rotates through the heating chamber, the discs carrying the loaded cans are simultaneously rotating about their own axes, which in turn causes the leads within the cans to constantly rotate about their own axes during the drying or heating operation.

DESCRIPTION OF THE DRAWINGS

In the drawings which illustrate the best mode presently contemplated for carrying out the present invention.

DESCRIPTION OF THE INVENTION

FIGS. 1 through 7 illustrate the handling and loading portion of our invention and specifically relate to the apparatus by which the extruded and cut leads are loaded into cylindrical cans within which the leads are subsequently heated and dried by a novel and unique rotary furnace which forms the second part of our invention. It will be understood that after the leads have been extruded and cut, they have a high moisture content which must be removed or at least substantially reduced before the leads can go to the firing operation. Since the extruded lead is easily deformable, i.e., having a consistency not unlike wet spaghetti, it is a considerable problem to handle and load the leads while at the same time maintaining them in substantially straight and unbroken condition. It is to the solution of this problem that the first portion of our invention is directed.

Figure 1:
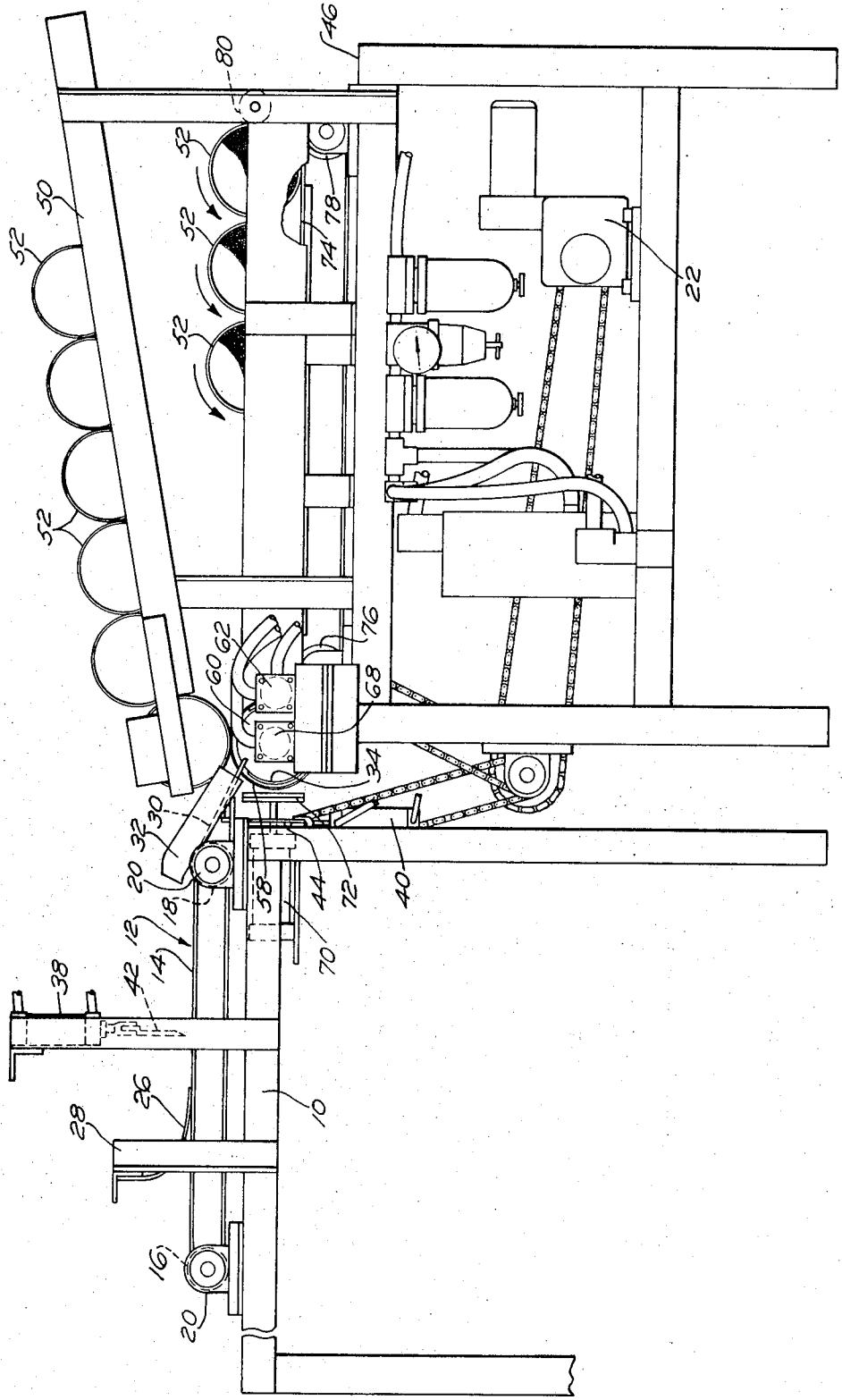
FIG. 1 is a side elevational view of that portion of our apparatus relating to the loading of the leads into the cylindrical heating cans.
Figure 2:
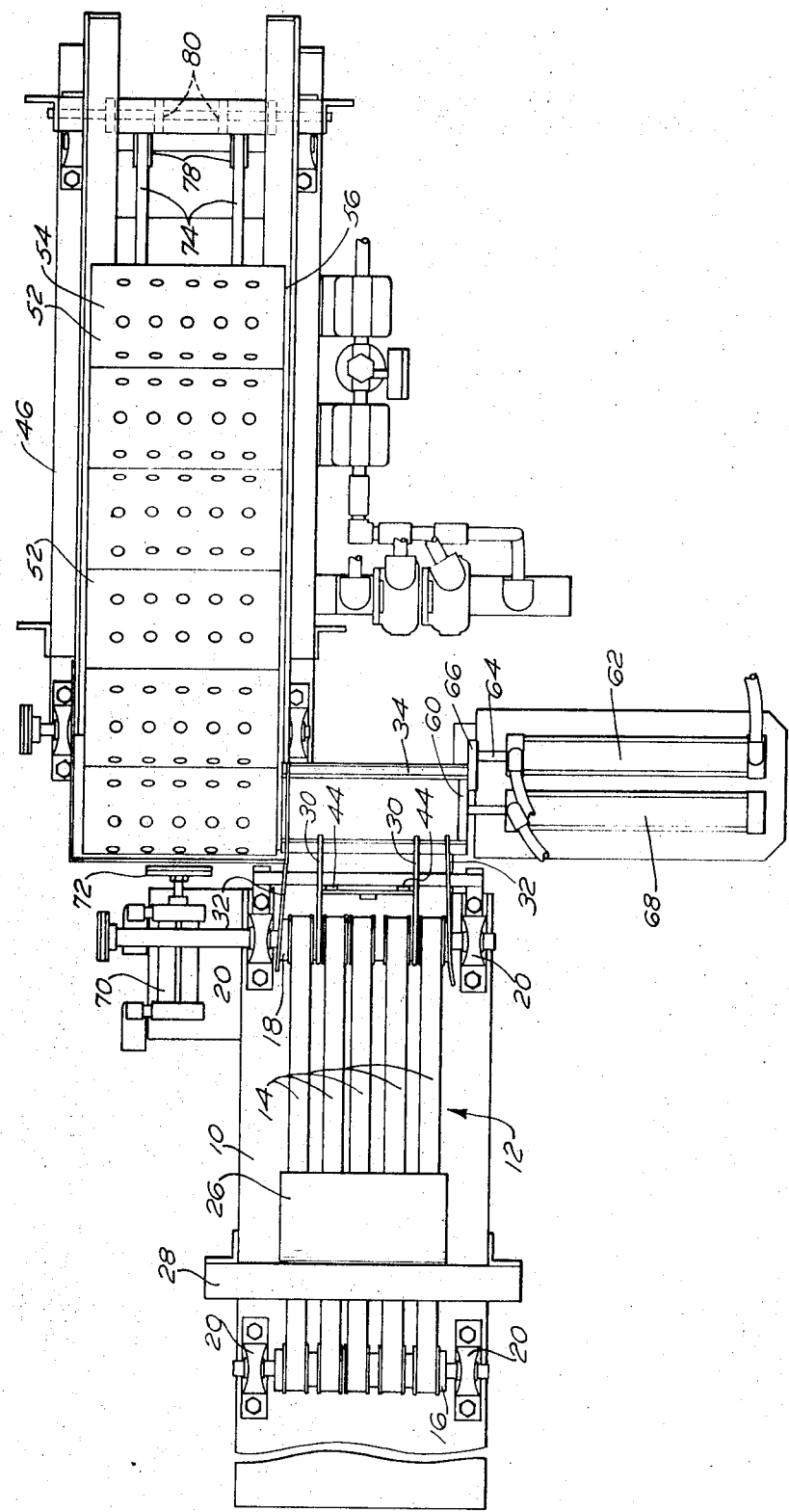
FIG. 2 is a top plan view thereof.

Referring to FIGS. 1 and 2, a table 10 has mounted thereon conveyor means 12 comprising a plurality of side-by-side, spaced, endless belts 14 extending around rollers 16 and 18 suitably journaled and mounted on table 10 by means of supports 20. Roller 18 is driven by motor 22 by means of a suitable chain drive, as shown most clearly in FIG. 1.

Figure 3:
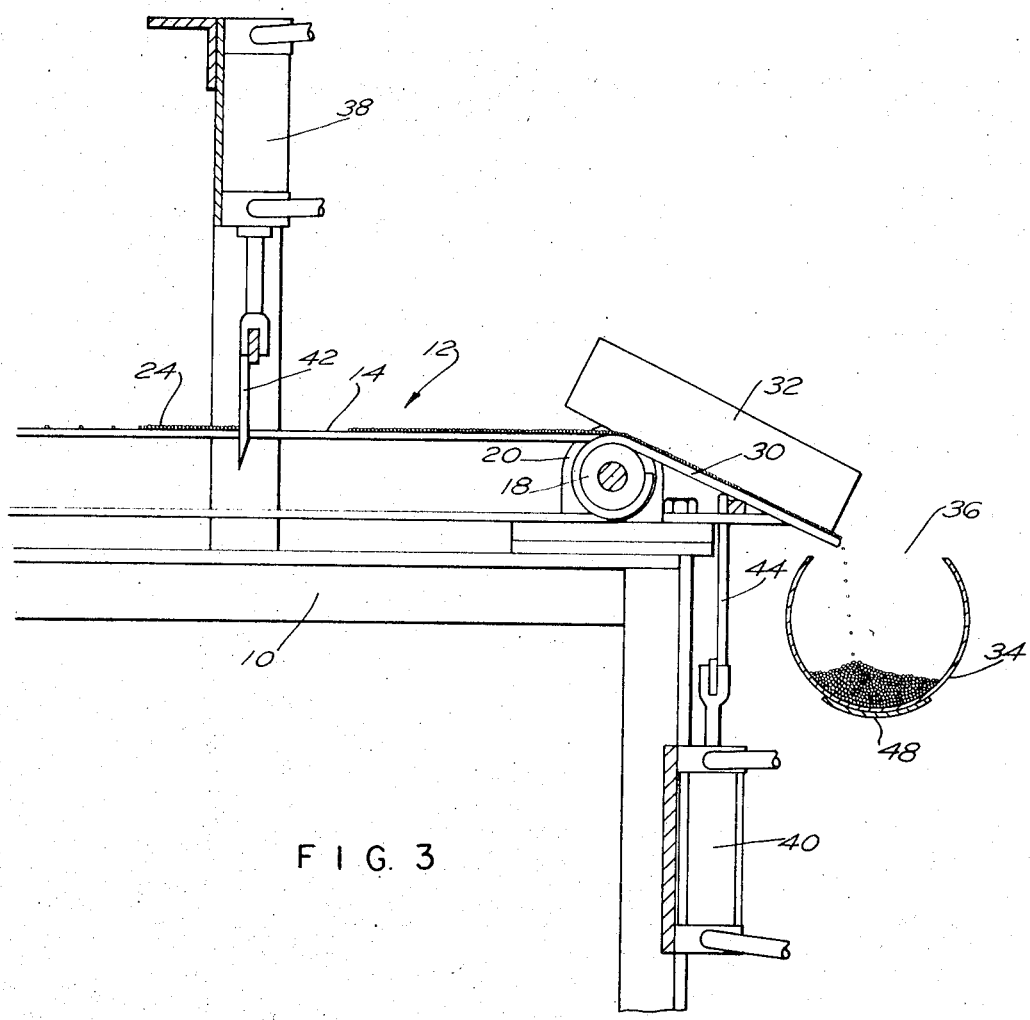
FIG. 3 is an enlarged fragmentary elevational view, partly in section, showing a part of the loading apparatus.
Figure 4:
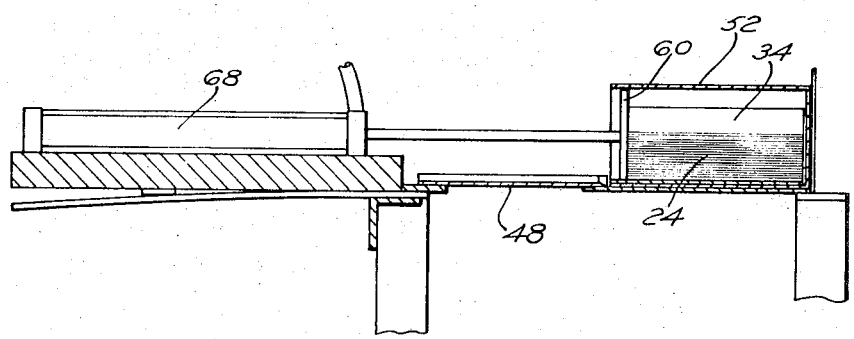
FIG. 4 is a fragmentary elevational view in section showing the loading cup transferring leads to a heating can.
Figure 5:
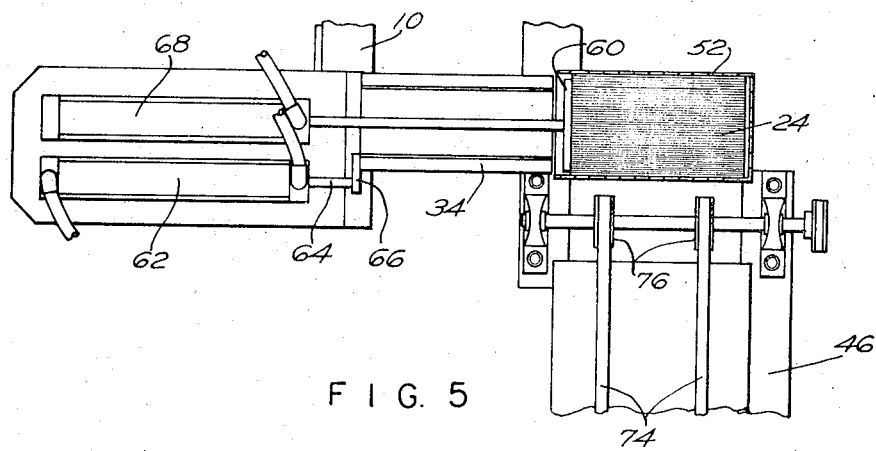
FIG. 5 is a fragmentary plan view, partly in section, showing the next step during the transfer of the leads from the loading cup to the heating can.
Figure 6:
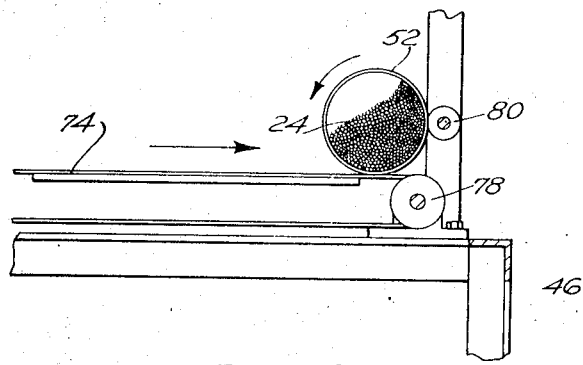
FIG. 6 is a fragmentary elevational view, partly in section, showing the means for rotating the loaded cans.

The leads 24, see FIG. 3, after having been extruded and cut and while still in a soft and deformable state, are positioned by any desired means, manual or automatic, onto the end of conveyor 12 adjacent roller 16, so that the leads lie transversely or laterally across the belts 14. The conveyor 12, which is continuously being driven by motor 22 in a clockwise direction, carries the leads toward the end of the conveyor adjacent roller 18; and, as the leads move therealong, they are engaged by a flap 26 carried by a bracket 28 suitably mounted on table 10, it being noted that the engagement of the leads by the flap 26 causes the leads to be oriented into a single layer, as shown in FIG. 3, and at the same time causes the leads to extend substantially perpendicularly across the belts 14 while at the same time imparting some degree of rotation to the leads about their own axes. The rotation of the leads about their own axes results in a self-straightening action that tends to remove any deformation or bowing of the leads.

When the leads reach the end of conveyor 12 adjacent roller 18, they are received by inclined guide means 30 which, together with side plates 32, serve to direct the leads into a loading cup 34. As will be seen most clearly in FIG. 3, the loading cup 34 is an open-ended cylinder, also having an open portion 36 at the top portion of its circumference, through which the leads 24 pass from guide means 30.

Mounted to the table 10 by any suitable means are a pair of air cylinders 38 and 40 which are operable to impart reciprocal movement to holding fingers 42 and 44, respectively. As will be seen most clearly in FIGS. 1 and 3, the fingers 42 are located intermediate the rollers 16 and 18, it being understood that when the fingers 42 are in their downward or operative position, as shown in FIG. 3, the fingers extend between the belts 14 to interrupt and block further movement of the leads 24 along conveyor 12. The fingers 44 cooperate with guides 30 and are adapted to move upwardly from the inoperative position shown in FIG. 3 to an operative position wherein further flow of the leads 24 down the guides 30 is interrupted and blocked, it being understood that the fingers 44 extend upwardly between the guides 30. It will be understood that when fingers 44 are retracted to their inoperative position, the fingers 42 are in their downward or blocking position, and vice versa. Means are provided for timing the operation of cylinders 38 and 40, and hence fingers 42 and 44, so that when the loading cup 34 has been filled to substantially a predetermined extent, cylinder 40 will operate and move fingers 44 to a blocking position, while at the same time cylinder 38 will cause fingers 42 to be retracted to an inoperative position.

Figure 12:
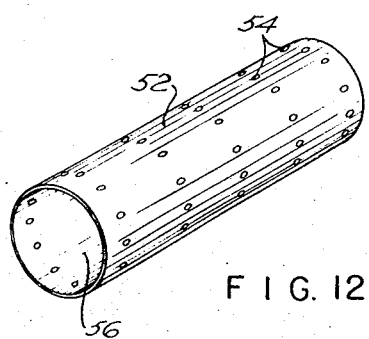
FIG. 12 is a perspective view showing one of the heating cans per se.

Adjacent to the table 10 is a second table 46, the table 46 carrying an arcuate support 48 on which the loading cup 34 is slidably mounted. It will be understood that the support 48 is in alignment with conveyor 12 so that under normal conditions the loading cup 34 is in position to receive the leads 24 as they descend from the guides 30. The table 46 is actually laterally disposed with respect to support 48, and the table 46 carries an upper inclined trackway 50 adapted to receive a plurality of cylindrical heating cans 52, shown in detail in FIG. 12. The cans 52 are of suitable metallic construction, have a plurality of perforations 54 in the side wall thereof, and are open at only one end, as at 56. The cans 52 are mounted on the trackway 50 so that the open ends 56 thereof are disposed toward the laterally positioned loading cup 34. The empty cans 52 descend by gravity down trackway 50 until the lowermost can is received at a loading station 58, which is in lateral alignment with loading cup 34, as shown most clearly in FIG. 1. It is important to note that the diameter of the loading cup 34 is somewhat less than the diameter of the cans 52, whereupon the loading cup 34 may slidably move into the inside of the can 52, which is positioned at loading station 58, by means now to be described.

As previously stated, the loading cup 34 is open at both ends, but the end farthest away from table 46 is normally closed by a circular plate 60. An air cylinder 62 is connected to loading cup 34 by means of piston rod 64 and connecting link 66, while another air cylinder 68 is connected directly to plate 60. As will be seen most clearly in FIG. 2, connecting link 66 overlies the end of plate 60; whereupon when cylinder 62 is operated to move the loading cup 34 into the can 52 located at station 58, the plate 60 will move therewith, thus insuring that all of the leads positioned within cup 34 move laterally into the can 52 located at the loading station. After the loaded cup 34 has been shifted laterally into the can 52 located at loading station 58, cylinder 62 causes piston rod 64 to retract; while, at the same time, cylinder 68 maintains the plate 60 in its position within the can 52. Thus, the plate 60 serves to hold the leads 24 within can 52 as the loading cup 34 retracts, and hence, in effect, the cup 34 slides from beneath the leads 24, the leads being held against movement by means of the plate 60. After the loading cup 34 has entirely retracted from can 52, cylinder 68 then becomes operative to retract the plate 60, whereupon the can 52 in loading station 58 is now fully loaded, and the loading cup 34 and its plate 60 are once again in position to receive another supply of leads from conveyor 12. This particular means for transferring the leads from loading cup 34 to can 52 has proven to be particularly advantageous in that the relatively soft leads are very gently deposited in can 52, thus resulting in minimal breakage and deformaof the leads during this transferring operation.

As soon as can 52 has been loaded, as above described, and the loading cup 34 and its plate 60 retracted, a further air cylinder 70 actuates a kicker 72 which ejects the loaded can 52 onto a conveyor 74 which comprises an endless belt extending around rollers 76 and 78, the roller 76 being chain driven by motor 22 in a clockwise direction. At the end of conveyor 74, adjacent roller 78, there is provided a stop means in the form of a laterally extending roller 80, whereupon the loaded can 52 is carried by conveyor 74 until it engages the roller 80 and then is maintained thereby, although the continuous movement of conveyor 74, cooperating with the roller 80, causes the loaded can 52 to continuously rotate about its own axis. This continued rotation of the loaded cans 52 further serves to maintain the loaded leads 24 in substantially straight condition. As soon as a loaded can 52 is ejected from the loading station 58 onto conveyor 74, another empty can 52 drops by gravity into the loading station, whereupon the aforedescribed loading operation is once again repeated.

Figure 7:
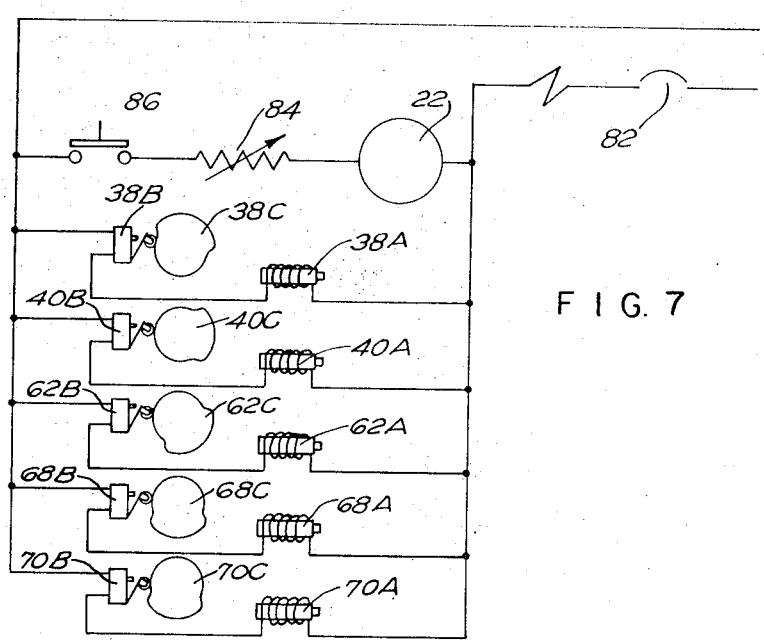
FIG. 7 is a schematic wiring diagram of the lead handling and loading apparatus.

It will be understood that the air cylinders all operate in a predetermined timed sequence, the operation of each cylinder being controlled by solenoids 38A, 40A, 62A, 68A, and 70A, see FIG. 7, which in turn are energized by switches 38B, 40B, 62B, 68B, and 70B, respectively, said switches in turn being actuated by cams 38C, 40C, 62C, 68C, and 70C, respectively, the cams being sequentially mounted on a cam shaft (not shown) which is driven by motor 22. FIG. 7 schematically illustrates the simple circuit involved, it being understood that a conventional circuit breaker is shown at 82, a rheostat for controlling the speed of motor 22 is shown at 84, and a pressure switch is shown at 86, whereby if there is not suitable hydraulic pressure in the system, the circuit will automatically open to stop motor 22 and hence operation of the apparatus.

In summarizing the operation of the abovedescribed handling and loading apparatus, it will be understood that the extruded and cut leads 24 are positioned by any suitable means on conveyor 12 and are carried therealong until blocked by holding fingers 42 which are controlled by cylinder 38. With the holding fingers 42 in blocking or operative position, the holding fingers 44 are in their retracted or inoperative position, whereupon the leads 24 which have been carried by conveyor 12 while fingers 42 were previously retracted are now free to descend down the guide means 30 into loading cup 34. When a sufficient time has elapsed for cup 34 to become loaded to a desired degree, cam 40C actuates switch 40B to energize solenoid 40A which in turn operates cylinder 40 to extend the fingers 44 to their blocking or operative position, thus preventing further leads from descending down the guide means 30. Simultaneously, cam 38C actuates switch 38B to energize solenoid 38A which in turn operates cylinder 38 to retract the fingers 42 to permit the leads 24 to once again be fed along conveyor 12 in preparation for the next loading operation. When loading of cup 34 has been completed, cam 62C actuates switch 62B to energize solenoid 62A which in turn operates cylinder 62 to move the loaded cup 34 laterally into the cam 52 located at the loading station 58. Operation of cylinder 62 also causes end plate 62 to move with cup 34. After the cup 34 and end plate 60 have been moved into the can 52, cylinder 62 retracts the cup 34; but cylinder 68 maintains the plate 60 in its position near the open end of cam 52. Thus, the plate 60 serves to maintain the leads 24 within the cam 52 as the cup 34 slides outwardly from beneath the leads, whereupon the leads are gently deposited into can 52. After the cup 34 has been completely retracted, cam 68C actuates switch 68B to energize solenoid 68A which in turn operates cylinder 68 to retract the plate 60 until it is once again positioned adjacent the end of cup 34 remote from the cans 52. As soon as plate 60 has been completely retracted, cam 70C actuates switch 70B to energize solenoid 70A, which in turn causes piston 70 to operate kicker 72, which engages the cam 52 that has just been loaded and ejects same onto conveyor 74, the conveyor 74 carrying the filled can until it reaches the end of conveyor 74 and abuts roller 84, whereupon the filled can is caused to rotate about its own axis, pending removal for the next operation. At the same time, another empty can descends into loading station 58, and the entire operation is once again repeated.

Referring now to FIGS. 8 through 13, the apparatus which receives the loaded cans 52 in order to effect heating and drying of the leads contained therein will now be described. This apparatus basically comprises a rotary furnace 88 which consists of a pair of large circular metal plates 90, each approximately eight feet in diameter, which metal plates are mounted on a shaft 92, which shaft is driven by a variable speed motor 94 to impart relatively slow rotation to said plates, approximately 93 minutes per revolution. Rotatably mounted on the outside surfaces of each of the plates 90, and extending around the peripheral portion thereof, are a plurality of circular discs 96, each of which has a plurality of spaced pins 98 extending outwardly therefrom. The pins 98 are spaced from each other so as to provide pockets for slidably receiving a plurality of the loaded cans 52, and, as shown in the drawings, each disc 96 is adapted to receive four cans 52. The loaded cans 52 are slid into position on the discs 96 with their open ends 56 inwardly disposed, or abutting the discs 96, whereupon the leads within the cans 52 are completely enclosed.

Figure 10:
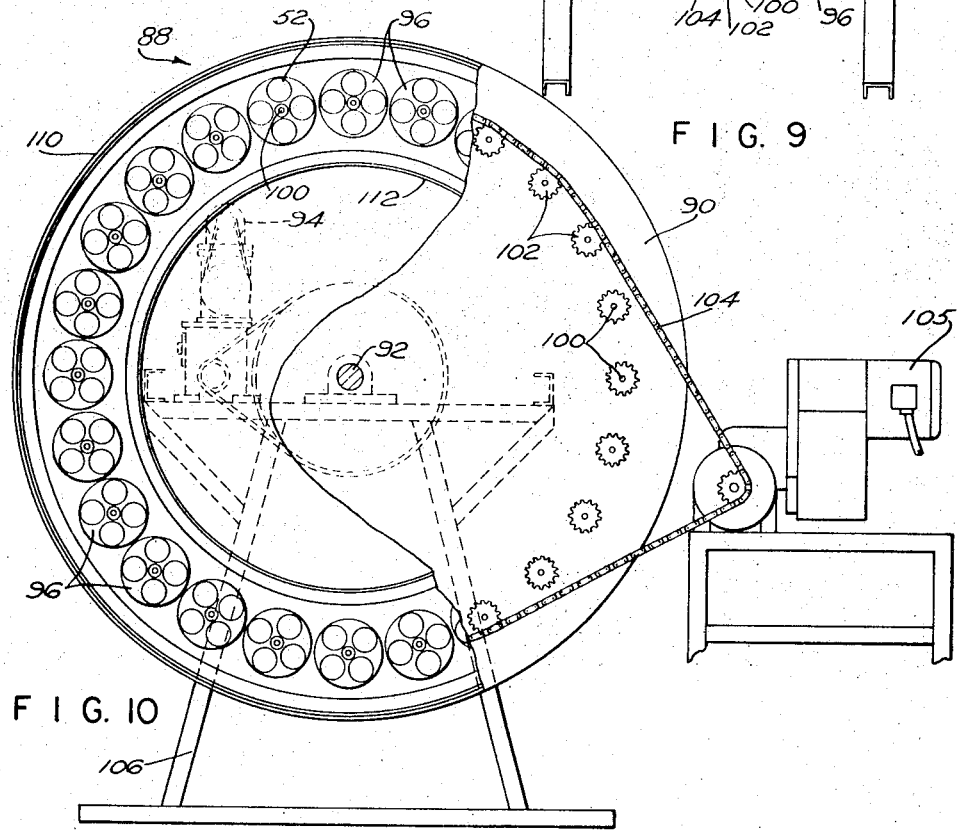
FIG. 10 is a side elevational view thereof, on an enlarged scale, with a portion broken away for purposes of illustration.
Figure 13:
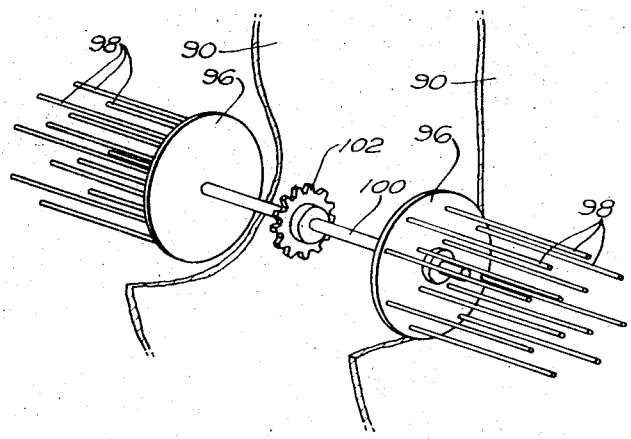
FIG. 13 is a fragmentary perspective showing one of the disc assemblies in detail.

As previously stated, the discs 96 are rotatably mounted on the plates 90; and, more specifically, each pair of aligned discs is mounted on a common shaft 100, as shown in FIG. 13, said shaft carrying a gear 102 located intermediate the plates 90. Through suitable gearing, and by means of chain 104 and motor 105, the gears 102 are driven to impart rotation to shaft 100 and hence to the discs 96 carried thereby. The rate of rotation of shaft 100 and discs 96 is substantially greater than that of the plates 90, and, specifically, the discs 96 are rotated at approximately 26 revolutions per minute. For reasons hereinafter to be described, it is important to note that chain 104 does not make engagement with a plurality of the gears 102; and, specifically, as shown in FIG. 10, there are always five gears 102 that are not being driven.

Fixedly mounted on the stanchions 106 are a pair of circular housings 108, each defining an annular heat chamber. The housings 108 are identical, and each is constructed of any desired refractory material, and comprises a peripheral end wall 110, a concentric inner wall 112, and a side wall consisting of a pair of removable panels 114. The removable panels 114 permit access to be had to any portion of the annular heating chamber for purposes of repair or the like.

Figure 8:
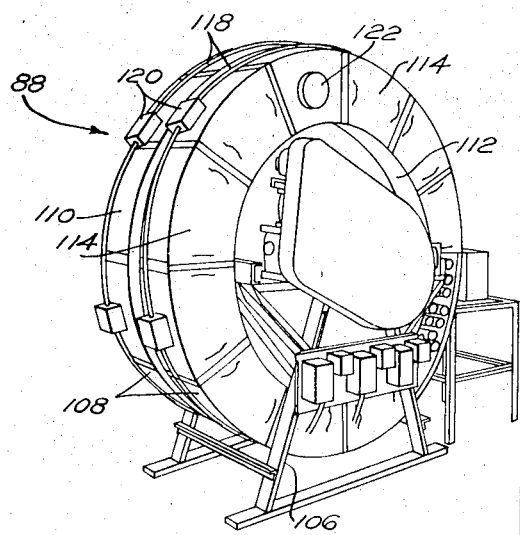
FIG. 8 is a perspective view of the rotary dryer that forms a part of our apparatus.
Figure 9:
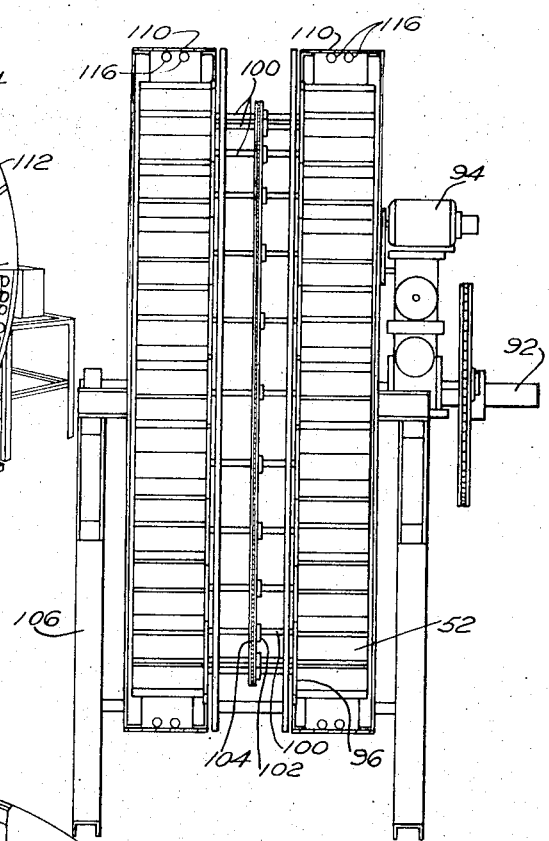
FIG. 9 is an end elevational view thereof on an enlarged scale.
Figure 11:
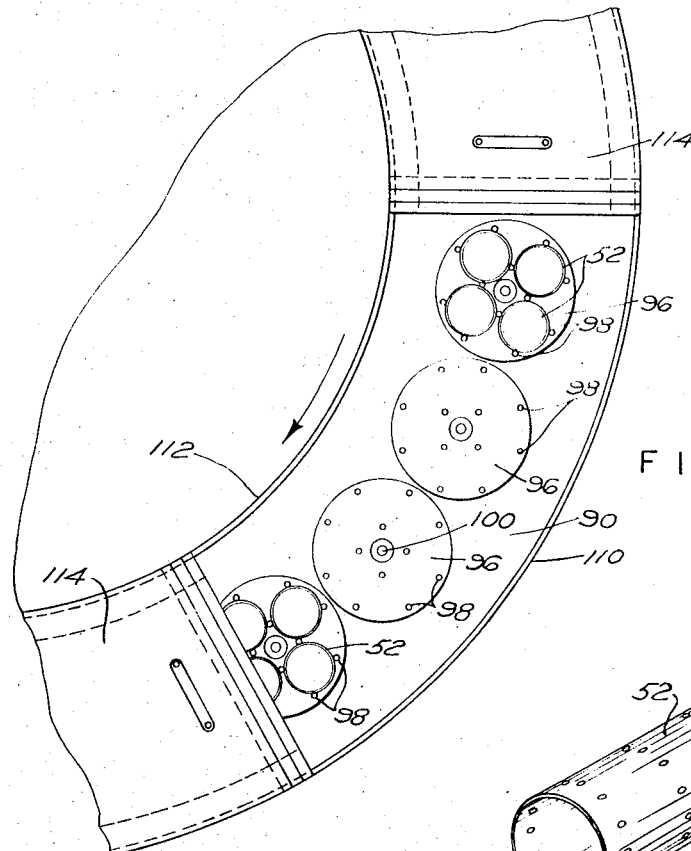
FIG. 11 is a fragmentary elevational view, on an enlarged scale, showing the loading and unloading station of the dryer apparatus.

At approximately the 4 o'clock position of the annular heating chamber, two panels 114 are not provided, as shown in FIG. 11, thus creating a load and unload station. It is important to note that the annular housing defined by the walls 110, 112 and 114 is fixedly mounted and does not rotate, although this annular housing does abut against the outer surface of the slowly rotating plate 90. Hence, the slowly rotating plates 90 carry the cans loaded thereon slowly through the annular chamber defined by the housings 108, while at the same time the discs 96 are rotating about their own axes at a substantially greater rate. Any suitable heating means may be provided within the annular housings 108, although we prefer to use calrod heaters comprising rods 116 that extend circumferentially around the inner surface of the walls 110, with the exception of the load and unload station shown in FIG. 11. In FIG. 8, the wiring for the heating system is shown at 118 with terminals boxes shown at 120 and with vent means shown at 122 for exhausting the heated atmosphere from the heat chamber.

The gears 102 that are not engaged by chain 104 are those gears which are in alignment with the discs 96 located at the load and unload station, thus facilitating the loading and unloading of the cans 52. It will be understood that since plates 90 move so slowly, it is a simple matter to unload the cans 52 from each disc 96 as the discs descend into the load and unload station, and at the same time to load cans of unheated lead onto the plates 96 before the plates enter into the heating chamber. The continuous rotation of the leads due to the rotation of the discs 96 further enhances the straightening of the leads and at the same time results in complete drying of the leads, it being understood that the perforations in the cans 52 also assist in insuring that good circulation of heat is achieved within the cans. The speed of rotation of the plates 90 and of the discs 96 may be varied, depending upon the type and size lead being treated. It is also important to note that the cams 52, when loaded, are not completely filled with leads, since the leads must be free to rotate within the cans as the cans rotate during various stages of the aforesaid operation. It also will be understood that although the furnace assembly 88 has been shown and described as comprising a pair of plates 90 and annular heat chambers 108, this is purely to increase capacity of the unit; and obviously our invention is equally applicable to a single unit or additional multiple units.

While there is shown and described herein certain specific structure embodying the invention, it will be manifest to those skilled in the art that various modifications and rearrangements of the parts may be made without departing from the spirit and scope of the underlying inventive concept and that the same is not limited to the articular forms herein shown and described.

I claim:

1. Apparatus for handling and loading pencil leads into cylindrical cans comprising first conveyor means for continuously receiving a plurality of leads laterally disposed with respect thereto, a cylindrical loading cup positioned adjacent an end of said conveyor means, the cylindrical side wall of said cup having a longitudinally extending open portion for receiving said laterally disposed leads therethrough, means for transferring said leads from said conveyor means to said cylindrical loading cup, means for moving said filled loading cup into a cylindrical heating can and for retracting it therefrom, and means for maintaining said leads in said can during retraction of said cup therefrom.

2. In the apparatus of claim 1, second conveyor means, means for ejecting said loaded can onto said second conveyor means, and means cooperating with said second conveyor means for causing loaded cans positioned thereon to rotate around their own axes.

3. In the apparatus of claim 1, means cooperating with said first conveyor means for straightening the leads thereon and orienting the leads into a single layer, said means also causing the leads to rotate about their own axes as they move along said first conveyor means.

4. In the apparatus of claim 1, said transferring means comprising inclined guides that receive the leads from said first conveyor means and cause the leads to roll by gravity into said loading cup.

5. In the apparatus of claim 4, stop means cooperating with said first conveyor means, said stop means being movable between an inoperative position and an operable position blocking passage of the leads to said guides, and actuating means moving said stop means to said operable position when said loading cup is filled to a predetermined degree.

6. In the apparatus of claim 1, said heating cans each comprising a metallic cylinder, open at one end, the circumferential wall of said cylinder having a plurality of perforations therein.

7. In the apparatus of claim 2, said second conveyor means comprising an endless belt, said cooperating means comprising a roller mounted above and adjacent to said belt, said roller blocking further movement of the cans along said belt whereby the continuous movement of the belt cooperates with said roller to cause said blocked cans to rotate about their own axes.

* * * * *